(12) United States Patent
Tignor

(10) Patent No.: US 6,469,882 B1
(45) Date of Patent: Oct. 22, 2002

(54) CURRENT TRANSFORMER INITIAL CONDITION CORRECTION

(75) Inventor: Michael S. Tignor, Watertown, CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,908

(22) Filed: Oct. 31, 2001

(51) Int. Cl.⁷ .................................................. H02H 3/00
(52) U.S. Cl. ...................... 361/93.1; 361/93.6; 361/93.3
(58) Field of Search ............................... 361/78, 79, 83, 361/93.2, 93.3, 93.6; 702/57, 60, 64

(56) References Cited

U.S. PATENT DOCUMENTS

| | | | |
|---|---|---|---|
| 2,340,682 A | 2/1944 | Powell | 200/147 |
| 2,719,203 A | 9/1955 | Gelzheiser et al. | 200/144 |
| 2,937,254 A | 5/1960 | Ericson | 200/114 |
| 3,158,717 A | 11/1964 | Jencks et al. | 200/116 |
| 3,162,739 A | 12/1964 | Klein et al. | 200/88 |
| 3,197,582 A | 7/1965 | Norden | 200/50 |
| 3,307,002 A | 2/1967 | Cooper | 200/116 |

(List continued on next page.)

FOREIGN PATENT DOCUMENTS

| | | |
|---|---|---|
| BE | 819 008 A | 12/1974 |
| BE | 897 691 A | 9/1994 |
| DE | 12 27 978 | 11/1966 |
| DE | 30 47 360 | 6/1982 |
| DE | 38 02 184 | 8/1989 |
| DE | 38 43 277 | 6/1990 |
| DE | 44 19 240 | 1/1995 |
| EP | 0 061 092 | 9/1982 |

(List continued on next page.)

OTHER PUBLICATIONS

US 4,259,351, 3/1981, Yamat (withdrawn)

*Primary Examiner*—Kim Huynh
(74) *Attorney, Agent, or Firm*—Cantor Colburn LLP (57) ABSTRACT

A method and apparatus is disclosed herein for protecting a power circuit within a first cycle after power up using a current transformer to sense current and an electronic trip unit having a first trip threshold value at power up and a second trip threshold value for the reference value at about the first half cycle of the first cycle after power up. The first and second trip threshold values are threshold values used to determine an over-current condition at different preselected times after powering up is initiated.

36 Claims, 4 Drawing Sheets

U.S. PATENT DOCUMENTS

| | | | |
|---|---|---|---|
| 3,517,356 A | 6/1970 | Hanafusa | 335/16 |
| 3,631,369 A | 12/1971 | Menocal | 337/110 |
| 3,803,455 A | 4/1974 | Willard | 317/33 SC |
| 3,883,781 A | 5/1975 | Cotton | 317/14 R |
| 4,053,940 A * | 10/1977 | Hinman et al. | 361/68 |
| 4,129,762 A | 12/1978 | Bruchet | 200/153 G |
| 4,144,513 A | 3/1979 | Shafer et al. | 335/46 |
| 4,158,119 A | 6/1979 | Krakik | 200/240 |
| 4,165,453 A | 8/1979 | Hennemann | 200/153 G |
| 4,166,988 A | 9/1979 | Ciarcia et al. | 335/9 |
| 4,220,934 A | 9/1980 | Wafer et al. | 335/16 |
| 4,255,732 A | 3/1981 | Wafer et al. | 335/16 |
| 4,259,651 A | 3/1981 | Yamat | 335/16 |
| 4,263,492 A | 4/1981 | Maier et al. | 200/288 |
| 4,276,527 A | 6/1981 | Gerbert-Gaillard et al. | 335/39 |
| 4,297,663 A | 10/1981 | Seymour et al. | 335/20 |
| 4,301,342 A | 11/1981 | Castonguay et al. | 200/153 SC |
| 4,360,822 A | 11/1982 | Gilmore | 361/98 |
| 4,368,444 A | 1/1983 | Preuss et al. | 335/166 |
| 4,375,021 A | 2/1983 | Pardini et al. | 200/147 B |
| 4,375,022 A | 2/1983 | Daussin et al. | 200/148 R |
| 4,376,270 A | 3/1983 | Staffen | 335/21 |
| 4,383,146 A | 5/1983 | Bur | 200/17 R |
| 4,392,036 A | 7/1983 | Troebel et al. | 200/322 |
| 4,393,283 A | 7/1983 | Masuda | 200/51.09 |
| 4,401,872 A | 8/1983 | Boichot-Castagne et al. | 200/153 G |
| 4,409,573 A | 10/1983 | DiMarco et al. | 335/16 |
| 4,435,690 A | 3/1984 | Link et al. | 335/37 |
| 4,467,297 A | 8/1984 | Boichot-Castagne et al. | 335/8 |
| 4,468,645 A | 8/1984 | Gerbert-Gaillard et al. | 335/42 |
| 4,470,027 A | 9/1984 | Link et al. | 335/16 |
| 4,479,143 A | 10/1984 | Watanabe et al. | 358/44 |
| 4,488,133 A | 12/1984 | McClellan et al. | 335/16 |
| 4,492,941 A | 1/1985 | Nagel | 361/331 |
| 4,541,032 A | 9/1985 | Schwab | 361/331 |
| 4,546,224 A | 10/1985 | Mostosi | 200/153 G |
| 4,550,360 A | 10/1985 | Dougherty | 361/93 |
| 4,562,419 A | 12/1985 | Preuss et al. | 335/195 |
| 4,589,052 A | 5/1986 | Dougherty | 361/94 |
| 4,595,812 A | 6/1986 | Tamaru et al. | 200/307 |
| 4,611,187 A | 9/1986 | Banfi | 335/16 |
| 4,612,430 A | 9/1986 | Sloan et al. | 200/327 |
| 4,616,198 A | 10/1986 | Pardini | 335/16 |
| 4,622,444 A | 11/1986 | Kandatsu et al. | 200/303 |
| 4,631,625 A | 12/1986 | Tedesco et al. | 200/153 G |
| 4,642,431 A | 2/1987 | Tedesco et al. | 200/153 G |
| 4,644,438 A | 2/1987 | Puccinelli et al. | 361/75 |
| 4,649,247 A | 3/1987 | Preuss et al. | 200/244 |
| 4,658,322 A | 4/1987 | Rivera | 361/37 |
| 4,672,501 A | 6/1987 | Bilac et al. | 361/96 |
| 4,675,481 A | 6/1987 | Markowski et al. | 200/144 R |
| 4,682,264 A | 7/1987 | Demeyer | 361/96 |
| 4,689,712 A | 8/1987 | Demeyer | 361/96 |
| 4,694,373 A | 9/1987 | Demeyer | 361/96 |
| 4,710,845 A | 12/1987 | Demeyer | 361/96 |
| 4,717,985 A | 1/1988 | Demeyer | 361/96 |
| 4,732,211 A | 3/1988 | Castonguay et al. | 335/192 |
| 4,733,321 A | 3/1988 | Lindeperg | 361/96 |
| 4,764,650 A | 8/1988 | Bur et al. | 200/153 G |
| 4,768,007 A | 8/1988 | Mertz et al. | 335/202 |
| 4,780,786 A | 10/1988 | Weynachter et al. | 361/87 |
| 4,831,221 A | 5/1989 | Yu et al. | 200/553 |
| 4,870,531 A | 9/1989 | Danek | 361/93 |
| 4,883,931 A | 11/1989 | Batteux et al. | 200/148 R |
| 4,884,047 A | 11/1989 | Baginski et al. | 335/10 |
| 4,884,164 A | 11/1989 | Dziura et al. | 361/97 |
| 4,900,882 A | 2/1990 | Bernard et al. | 200/147 R |
| 4,910,485 A | 3/1990 | Bologeat-Mobleu et al. | 335/195 |
| 4,914,541 A | 4/1990 | Tripoli et al. | 361/94 |
| 4,916,420 A | 4/1990 | Bartolo et al. | 335/172 |
| 4,916,421 A | 4/1990 | Pardini et al. | 335/185 |
| 4,926,282 A | 5/1990 | McGhie | 361/102 |
| 4,935,590 A | 6/1990 | Malkin et al. | 200/148 A |
| 4,937,706 A | 6/1990 | Schueller et al. | 361/396 |
| 4,937,757 A * | 6/1990 | Dougherty | 361/97 |
| 4,939,492 A | 7/1990 | Raso et al. | 335/42 |
| 4,943,691 A | 7/1990 | Mertz et al. | 200/151 |
| 4,943,888 A | 7/1990 | Jacob et al. | 361/96 |
| 4,950,855 A | 8/1990 | Bolonegeat-Mobleu et al. | 200/148 A |
| 4,951,019 A | 8/1990 | Gula | 335/166 |
| 4,952,897 A | 8/1990 | Barnel et al. | 335/147 |
| 4,958,135 A | 9/1990 | Baginski et al. | 335/8 |
| 4,965,543 A | 10/1990 | Batteux | 335/174 |
| 4,983,788 A | 1/1991 | Pardini | 200/16 R |
| 5,001,313 A | 3/1991 | Leclerq et al. | 200/148 B |
| 5,004,878 A | 4/1991 | Seymour et al. | 200/144 R |
| 5,029,301 A | 7/1991 | Nebon et al. | 335/16 |
| 5,030,804 A | 7/1991 | Abri | 200/323 |
| 5,057,655 A | 10/1991 | Kersusan et al. | 200/148 B |
| 5,077,627 A | 12/1991 | Fraisse | 361/93 |
| 5,083,081 A | 1/1992 | Barrault et al. | 324/126 |
| 5,095,183 A | 3/1992 | Raphard et al. | 200/148 A |
| 5,103,198 A | 4/1992 | Morel et al. | 335/6 |
| 5,115,371 A | 5/1992 | Tripodi | 361/106 |
| 5,120,921 A | 6/1992 | DiMarco et al. | 200/401 |
| 5,132,865 A | 7/1992 | Mertz et al. | 361/6 |
| 5,138,121 A | 8/1992 | Streich et al. | 200/293 |
| 5,140,115 A | 8/1992 | Morris | 200/308 |
| 5,153,802 A | 10/1992 | Mertz et al. | 361/18 |
| 5,155,315 A | 10/1992 | Malkin et al. | 200/148 R |
| 5,166,483 A | 11/1992 | Kersusan et al. | 200/144 A |
| 5,172,087 A | 12/1992 | Castonguay et al. | 335/160 |
| 5,178,504 A | 1/1993 | Falchi | 411/553 |
| 5,184,717 A | 2/1993 | Chou et al. | 200/401 |
| 5,187,339 A | 2/1993 | Lissandrin | 200/148 F |
| 5,198,956 A | 3/1993 | Dvorak | 361/106 |
| 5,200,724 A | 4/1993 | Gula et al. | 335/166 |
| 5,210,385 A | 5/1993 | Morel et al. | 200/146 R |
| 5,239,150 A | 8/1993 | Bolongeat-Mobleu et al. | 200/148 R |
| 5,260,533 A | 11/1993 | Livesey et al. | 200/401 |
| 5,262,744 A | 11/1993 | Arnold et al. | 335/8 |
| 5,280,144 A | 1/1994 | Bolongeat-Mobleu et al. | 200/148 R |
| 5,281,776 A | 1/1994 | Morel et al. | 200/144 |
| 5,296,660 A | 3/1994 | Morel et al. | 200/146 R |
| 5,296,664 A | 3/1994 | Crookston et al. | 200/401 |
| 5,298,874 A | 3/1994 | Morel et al. | 335/8 |
| 5,300,907 A | 4/1994 | Nereau et al. | 335/172 |
| 5,310,971 A | 5/1994 | Vial et al. | 200/244 |
| 5,313,180 A | 5/1994 | Vial et al. | 335/16 |
| 5,317,471 A | 5/1994 | Izoard et al. | 361/105 |
| 5,331,500 A | 7/1994 | Corcoles et al. | 361/93 |
| 5,334,808 A | 8/1994 | Bur et al. | 200/50 |
| 5,341,191 A | 8/1994 | Crookston et al. | 335/16 |
| 5,347,096 A | 9/1994 | Bolongeat-Mobleu et al. | 200/148 B |
| 5,347,097 A | 9/1994 | Bolongeat-Mobleu et al. | 200/148 B |
| 5,350,892 A | 9/1994 | Rozier | 200/144 B |
| 5,357,066 A | 10/1994 | Morel et al. | 200/17 R |
| 5,357,068 A | 10/1994 | Rozier | 200/148 R |
| 5,357,394 A | 10/1994 | Piney | 361/72 |
| 5,361,052 A | 11/1994 | Ferullo et al. | 335/172 |
| 5,373,130 A | 12/1994 | Barrault et al. | 200/147 R |
| 5,379,013 A | 1/1995 | Coudert | 335/17 |
| 5,424,701 A | 6/1995 | Castonguary et al. | 335/172 |
| 5,438,176 A | 8/1995 | Bonnardel et al. | 200/400 |

| | | | | | | |
|---|---|---|---|---|---|---|
| 5,440,088 A | 8/1995 | Coudert et al. ............. 200/303 | EP | 0 258 090 | 3/1988 |
| 5,449,871 A | 9/1995 | Batteux et al. ............. 200/401 | EP | 0 264 313 | 4/1988 |
| 5,450,048 A | 9/1995 | Leger et al. ................ 335/132 | EP | 0 264 314 | 4/1988 |
| 5,451,729 A | 9/1995 | Onderka et al. ................ 200/18 | EP | 0 283 189 | 9/1988 |
| 5,457,295 A | 10/1995 | Tanibe et al. ............... 200/293 | EP | 0 283 358 | 9/1988 |
| 5,467,069 A | 11/1995 | Payet-Burin et al. ......... 335/42 | EP | 0 291 374 | 11/1988 |
| 5,469,121 A | 11/1995 | Payet-Burin ................ 335/16 | EP | 0 295 155 | 12/1988 |
| 5,472,016 A | 12/1995 | Baginski et al. ......... 200/43.11 | EP | 0 295 158 | 12/1988 |
| 5,475,558 A | 12/1995 | Barjonnet et al. ............ 361/64 | EP | 0 309 923 | 4/1989 |
| 5,477,016 A | 12/1995 | Baginski et al. ......... 200/43.11 | EP | 0 313 106 | 4/1989 |
| 5,479,143 A | 12/1995 | Payet-Burin ................ 335/202 | EP | 0 313 422 | 4/1989 |
| 5,483,212 A | 1/1996 | Lankuttis et al. ........... 335/132 | EP | 0 314 540 | 5/1989 |
| 5,485,343 A | 1/1996 | Santos et al. ............... 361/115 | EP | 0 331 586 | 9/1989 |
| D367,265 S | 2/1996 | Yamagata et al. ......... D13/160 | EP | 0 337 900 | 10/1989 |
| 5,493,083 A | 2/1996 | Olivier .................... 200/17 R | EP | 0 342 133 | 11/1989 |
| 5,504,284 A | 4/1996 | Lazareth et al. .......... 200/50 R | EP | 0 367 690 | 5/1990 |
| 5,504,290 A | 4/1996 | Baginski et al. ............. 200/401 | EP | 0 371 887 | 6/1990 |
| 5,510,761 A | 4/1996 | Boder et al. ................ 335/172 | EP | 0 375 568 | 6/1990 |
| 5,512,720 A | 4/1996 | Coudert et al. ............. 200/400 | EP | 0 394 144 | 10/1990 |
| 5,515,018 A | 5/1996 | DiMarco et al. ............. 335/16 | EP | 0 394 922 | 10/1990 |
| 5,519,561 A | 5/1996 | Mrenna et al. ............. 361/105 | EP | 0 399 282 | 11/1990 |
| 5,534,674 A | 7/1996 | Steffens ...................... 218/154 | EP | 0 407 310 | 1/1991 |
| 5,534,832 A | 7/1996 | Duchemin et al. ............ 335/16 | EP | 0 452 230 | 10/1991 |
| 5,534,835 A | 7/1996 | McColloch et al. ........ 335/172 | EP | 0 555 158 | 8/1993 |
| 5,534,840 A | 7/1996 | Cuingnet ....................... 337/1 | EP | 0 560 697 | 9/1993 |
| 5,539,168 A | 7/1996 | Linzenich ................... 200/303 | EP | 0 567 416 | 10/1993 |
| 5,543,595 A | 8/1996 | Mader et al. ............... 200/401 | EP | 0 595 730 | 5/1994 |
| 5,552,755 A | 9/1996 | Fello et al. .................... 335/18 | EP | 0 619 591 | 10/1994 |
| 5,581,219 A | 12/1996 | Nozawa et al. ............. 335/132 | EP | 0 665 569 | 8/1995 |
| 5,604,656 A | 2/1997 | Derrick et al. ............... 361/187 | EP | 0 700 140 | 3/1996 |
| 5,608,367 A | 3/1997 | Zoller et al. ................ 335/132 | EP | 0 889 498 | 1/1999 |
| 5,784,233 A | 7/1998 | Bastard et al. ................ 361/36 | FR | 2 410 353 | 6/1979 |
| 6,137,665 A * | 10/2000 | Boudaud ..................... 361/63 | FR | 2 512 582 | 3/1983 |
| | | | FR | 2 553 943 | 4/1985 |
| | | | FR | 2 592 998 | 7/1987 |
| | | | FR | 2 682 531 | 4/1993 |
| | | | FR | 2 697 670 | 5/1994 |
| | | | FR | 2 699 324 | 6/1994 |
| | | | FR | 2 714 771 | 7/1995 |
| | | | GB | 2 233 155 | 1/1991 |
| | | | RU | 1 227 978 | 2/1992 |
| | | | WO | 92/00598 | 1/1992 |
| | | | WO | 92/05649 | 4/1992 |
| | | | WO | 94/00901 | 1/1994 |

FOREIGN PATENT DOCUMENTS

| | | |
|---|---|---|
| EP | 0 064 906 | 11/1982 |
| EP | 0 066 486 | 12/1982 |
| EP | 0 076 719 | 4/1983 |
| EP | 0 117 094 | 8/1984 |
| EP | 0 140 761 | 5/1985 |
| EP | 0 174 904 | 3/1986 |
| EP | 0 196 241 | 10/1986 |
| EP | 0 224 396 | 6/1987 |
| EP | 0 235 479 | 9/1987 |
| EP | 0 239 460 | 9/1987 |

* cited by examiner

CURRENT TRANSFORMER INITIAL CONDITION CORRECTION

BACKGROUND OF INVENTION

A transformer typically includes two or more inductively coupled windings that effect the transfer of electric energy from one circuit to another with a change in voltage, current, phase, or other electric characteristic. Transformers are used in many different electrical devices. For example, transformers are used in modern circuit breaker devices for sensing current in an electrical distribution circuit and providing a signal indicative of the sensed current to electronic circuitry, known as a trip unit, housed in the circuit breaker.

Conventional circuit breaker devices with electronic trip units typically include a current transformer ("CT") disposed around a line conductor of a distribution system providing electrical power to a load. The current transformer has a multi-turn secondary winding electrically connected to the circuit breaker's electronic trip unit. The secondary winding is used to sense a current overload or imbalance in the aforesaid line conductors and, in response thereto, provide an output signal proportional to the current overload or imbalance to the trip unit. Upon receipt of such a signal the trip unit initiates an interruption of the current supplied to the load through the line conductors. The secondary winding may also be used to provide operating power to the electronic components within the circuit breaker's electronic trip unit.

Operationally, the load current in a circuit breaker can cover a very wide range. Unfortunately, the magnetic materials commonly available for the core of the current transformer limit the dynamic range of the sensing device. Peak flux density is a limiting factor at the upper end of the dynamic range, while core loss/declining permeability is a limit at the lower end. For a given core material and required accuracy, these parameters limit the operating range of the current transformer. While the dynamic range could be extended by increasing the volume of the core material and/or the turns of a secondary winding, these solutions increase the size of the current transformer, which is often critical.

Circuit breakers are designed to conform to published time-current curves to an accuracy of about +/−20 percent, which may apply to either current or time. In general, a circuit breaker is specified not to trip at its rated current value, and must trip at a current of perhaps 150 percent of its rating. At higher currents, breakers are expected to trip instantaneously, or with no intentional delay, which is typically no greater than 0.02 seconds, or about one cycle.

Often, a toroidal current transformer having a core in the shape of a toroid is utilized. A continuous, toroidal core provides a desirable, full dynamic range. However, the use of this type of core in a current transformer for use with a trip unit is not ideal. A trip unit is required to power-up and trip on the first half cycle. Therefore, it is necessary for the current output by the current transformer to have a uniform-sized first half cycle. In other words, it is necessary to determine the current output within the first half cycle, rather than waiting for a first full cycle to determine whether the breaker is in a trip condition. However, due to the initial flux density in the core being zero at power up because the field is zero, the current transformer output is about half of what it is after about the first cycle. While presently employed methods provide for delaying the determination of a trip condition until the second half cycle, such a delay is undesirable and may cause significant damage to the circuit breaker and/or circuit.

Another commonly used method to compensate for the nonuniform first half cycle output includes having an electronic trip unit ("ETU") trip the circuit breaker if the ETU senses a current in the first half cycle that is twice as large as normally needed to trip in the steady state operation. This is based on the assumption that the initial condition in the CT magnetic flux will limit the output on the first half cycle only. In other words, during steady state operation, the magnetic field changes from a positive maximum to a negative maximum in a typical output current having a typical sine wave form. However, on the first half cycle, the field starts at zero when the circuit breaker is powered up. This initial magnetic variation causes a "stunted" output for the first half cycle at power up. Thus, there is a need for accurate determination of a trip condition at the first half cycle, as the stunted output of the CT is not an accurate reflection of the current flow compared with the output of the CT in steady state operation.

SUMMARY OF INVENTION

The above discussed and other drawbacks and deficiencies are overcome or alleviated by a method of protecting a power circuit within a first cycle after powering up using an electronic trip unit and a current transformer to sense current, the method comprising: accepting a first trip threshold value at power up; sensing for a trip condition in the power circuit within about a first half cycle of the first cycle with reference to the first trip threshold value, the trip condition comprising an over-current condition; generating a trip signal if the trip condition is sensed with reference to the first trip threshold value; accepting a second trip threshold value after the first half cycle if the trip condition is not sensed; sensing for the trip condition with reference to the second trip threshold value; and generating a trip signal if the trip condition is sensed with reference to the second trip threshold value.

In an alternative embodiment, a trip unit for determining a trip condition within about a half cycle after power up using a current sensor to sense current is disclosed, the trip unit comprising: a current transformer as the current sensor to sense current; an input for inputting a signal from the current transformer, an analog to digital converter converting the signal into digital form; and a controller having first and second trip threshold values stored therein for determining an instantaneous trip condition, the controller accepting the first trip threshold value at power up, the controller accepting the second trip threshold value and replacing the first trip threshold value with the second trip threshold value after power up, the controller monitoring the signal and determining whether an over-current condition exists with reference to one of the accepted trip threshold values, the controller causing a trip signal to be output in the case of an over-current condition.

BRIEF DESCRIPTION OF DRAWINGS

Referring now to the drawings wherein like elements are numbered alike in the several Figures.

DETAILED DESCRIPTION

Figure 1:
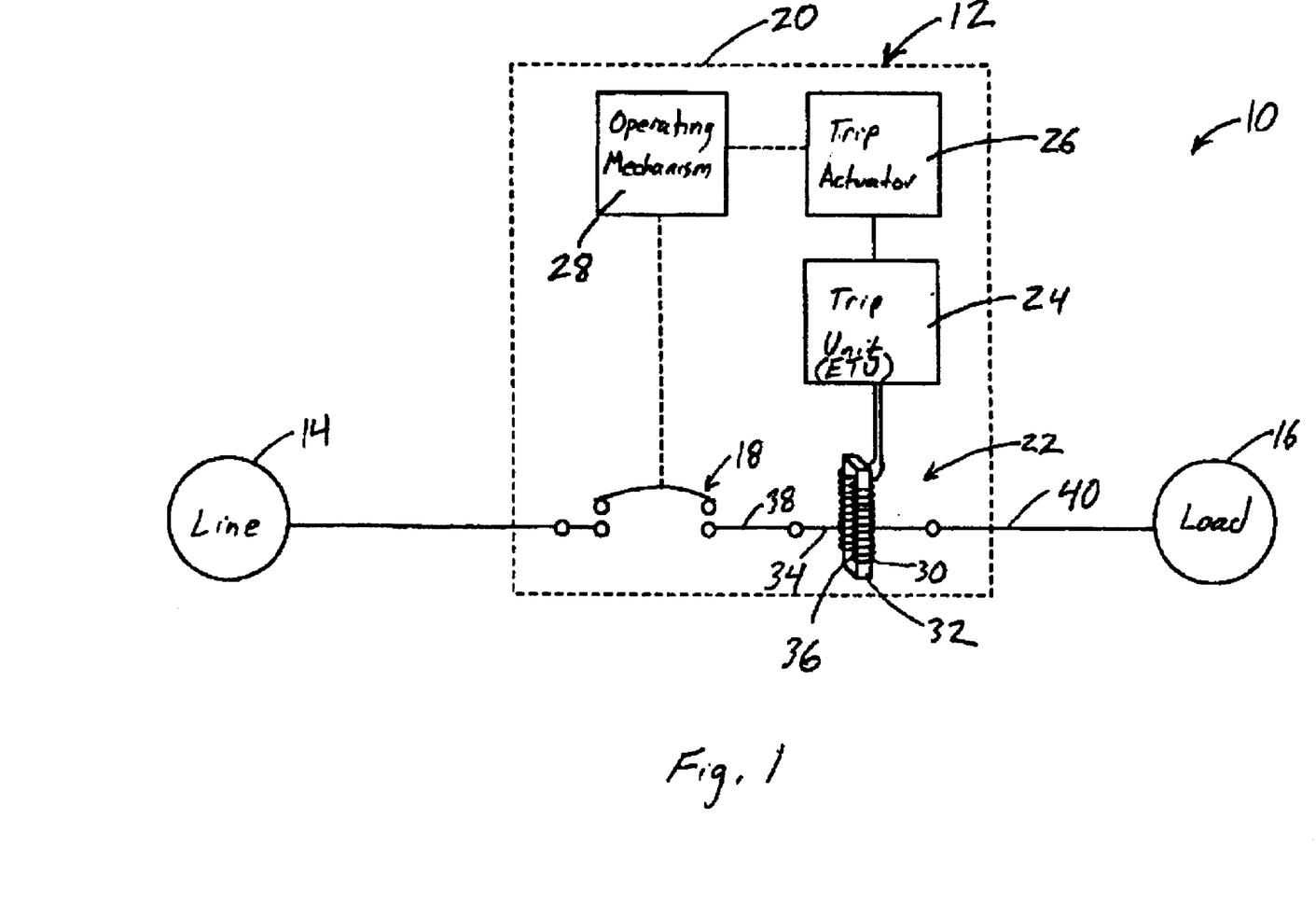
FIG. 1 is a schematic diagram of an electrical distribution system including a circuit breaker.

Referring to FIG. 1, a schematic diagram of an electrical distribution system 10 including a circuit breaker 12 is shown. Circuit breaker 12 is electrically connected between a line-side power supply 14 and an electrical load 16. Circuit breaker 12 includes electrical contacts 18 mounted within a housing 20 and connected in series between power supply 14 and load 16. Contacts 18 are separable to stop the flow of electrical current from power supply 14 to load 16. Also mounted within housing 20 are a current transformer (CT) 22, an electronic trip unit (ETU) 24, a trip actuator or module 26, and an operating mechanism 28.

Transformer 22 includes one or more multi-turn, secondary windings 30, a ferrous core 32, and a single-turn primary conductor 34. Each of the secondary windings 30 is electrically connected to electronic trip unit 24. The transformer core 32 is a toroidal, rectangular, or square shaped structure with an aperture 36 disposed through its center. The primary conductor 34 is a single-turn winding that extends through aperture 36. The primary conductor 34 is electrically connected to contacts 18 via a contact strap 38, and is electrically coupled to load 16 via a load-side conductor 40.

Electronic trip unit 24 is an electronic circuit electrically coupled to secondary winding 30 and to the trip actuator 26. The trip actuator 26 is an electromechanical device, such as a solenoid or flux shift device, that is mechanically coupled to the operating mechanism 28. The operating mechanism 28 is a spring-driven, mechanical latching device that is mechanically coupled to the separable contacts 18. The construction of trip unit 24, trip actuator 26, and operating mechanism 28 are well-known in the art.

During operation, current passing through the primary conductor 34 induces magnetic flux in the core 32, which, in turn, induces a current signal in the secondary winding 30. The current signal, which is proportional to the current in the primary conductor 34, is provided to the trip unit 24. The trip unit 24 compares the current signal to a predetermined threshold to determine the existence of an anomalous condition in the electrical distribution circuit 10. Such anomalous conditions include, for example, an overcurrent condition, a phase loss condition, a ground fault condition, and the like. Upon detecting the anomalous condition, the trip unit 24 provides a trip signal to the trip actuator 26. Upon receiving the trip signal, the trip actuator 26 unlatches (trips) the operating mechanism 28. When tripped, one or more springs (not shown) in operating mechanism 28 act to effect the separation of the contacts 18 to stop the flow of electrical current from power supply 14 to load 16.

For ease of illustration, FIG. 1 shows one current transformer 22, however it is to be appreciated that in a multiphase electrical distribution system there is one current transformer for each phase. The current transformer 22 provides both operating power as well as current sampling to the electronic trip unit 24.

Figure 2:
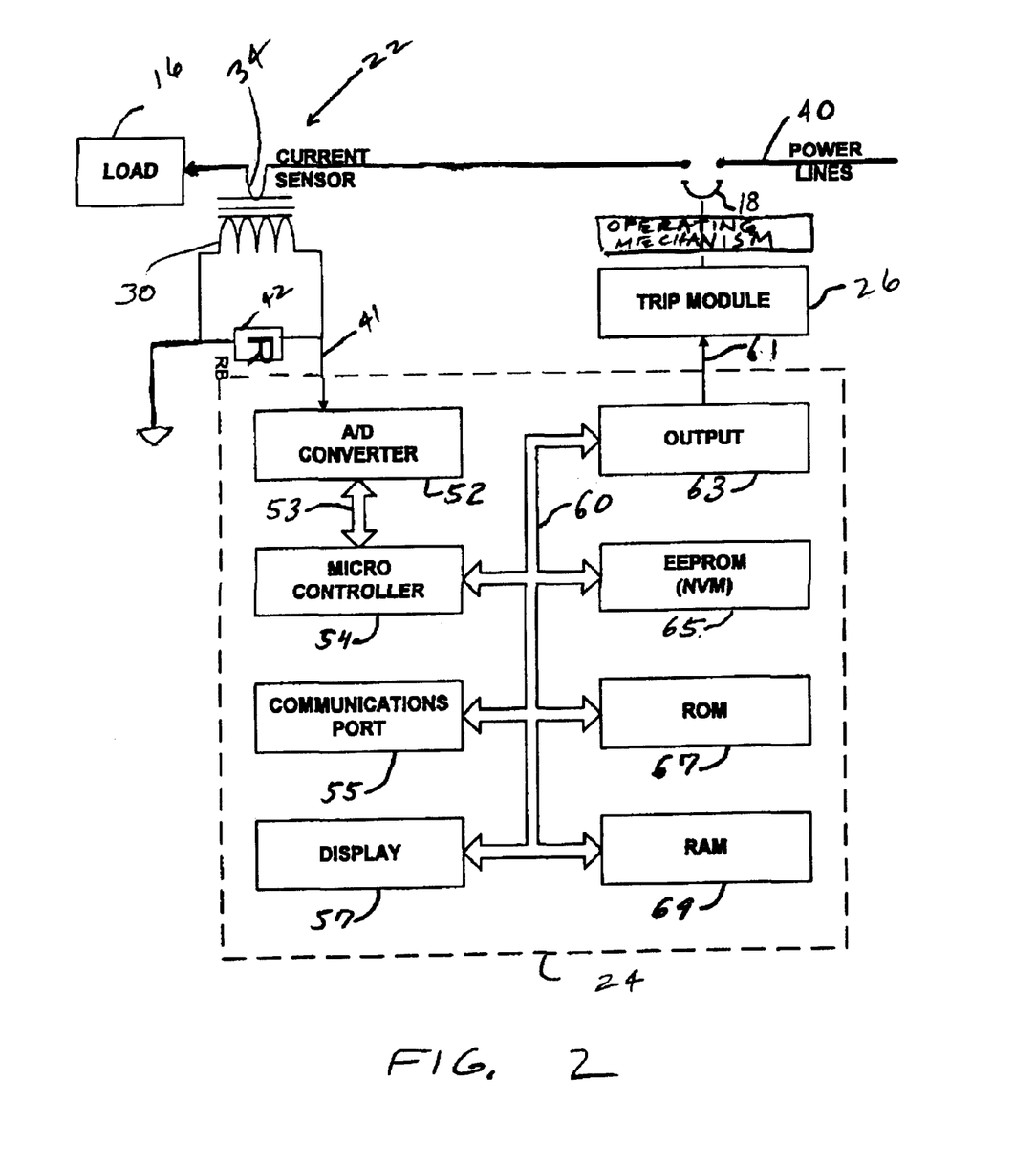
FIG. 2 is a diagrammatic representation of the electronic components interfacing the current transformer within the circuit breaker of FIG. 1.

The operation of the trip unit 24 with current transformer 22 is best seen by now referring to FIG. 2. Trip unit 24 includes an input for receiving current information from current transformer 22 via signal line 41. Current transformer 22 detects the current in power line 40 between a source line 14 and load 16. The current in the secondary winding 30 passes through a burden resistor 42 to create a voltage signal. Current transformer 22 inputs the voltage signal via line 41 directed to an analog-digital A/D converter 52 where the analog output from transformer, a 22 reisnverted into digital information which is then provided to micro controller 54 via data path 53. Micro-controller 54 is connected via data bus 60 to random access memory RAM 69, read-only memory ROM 67, non-volatile memory NVM 65, display 57, communications port 55, and output 63. Non-volatile memory may include, for example, EEPROM (electrically erasable programmable read-only memory), EPROM (erasable programmable read-only memory), flash memory, or other non-volatile memory. Micro-controller 53 compares the digital data to a threshold value that is set in nonvolatile memory to determine if a trip condition is present. If a trip condition is present, the micro-controller generates a trip signal via bus 60 to output 63 for actuating trip module 26.

Output 63 generates a trip signal which is transmitted along line 61 to external trip module 26 which actuates operating mechanism 28 for actuating movable contacts 20 to separate from fixed contacts 18 thereby opening the circuit. Trip unit 24 is also capable of outputting information via display 57 which may be LEDs, LCD, or other display means.

Read-only memory 67 or non-volatile memory 65 includes a software program containing instructions readable by controller 54. Non-volatile memory 65 may also include control parameters such as time-current curve information necessary for over-current protection. These control parameters may be updated as needed depending on the application.

In operation, the microprocessor receives information from current transformer sensor 22. This information is monitored by the processor 54 to determine if a trip condition exists. In an exemplary embodiment, processor or controller 54 has at least two threshold values for determining an overcurrent condition which necessitates tripping the circuit breaker. A first threshold value is set in nonvolatile memory 65 for comparing the current after a first full cycle or after the second half cycle. The second threshold value is set in nonvolatile memory for comparing the current during power up to about the first half cycle or up to about the completion of the second half of the first cycle. In other words, the second threshold value is operative during power up to about the first half of the first cycle in which to determine whether an overcurrent condition exists. After about the first half of the first cycle, controller 54 uses the first threshold value to determine whether an overcurrent condition exists. In this manner, the microcontroller 54 can determine whether an overcurrent condition exists in the first half of a first cycle after power up when current transformer 22 reflects a "stunted" output signal not accurately indicative of current in the circuit breaker during this first half cycle.

Figure 3:
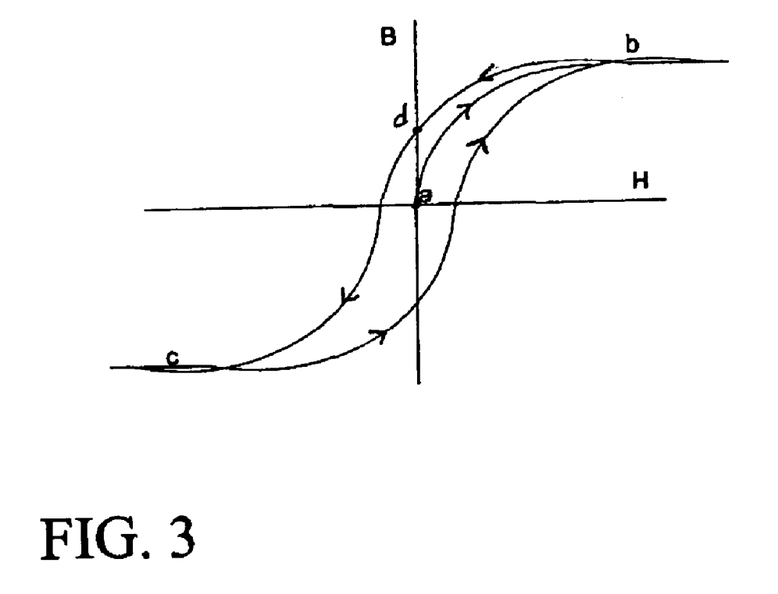
FIG. 3 is an illustration of initial and steady state magnetization curves for the current transformer in FIG. 2.
Figure 4:
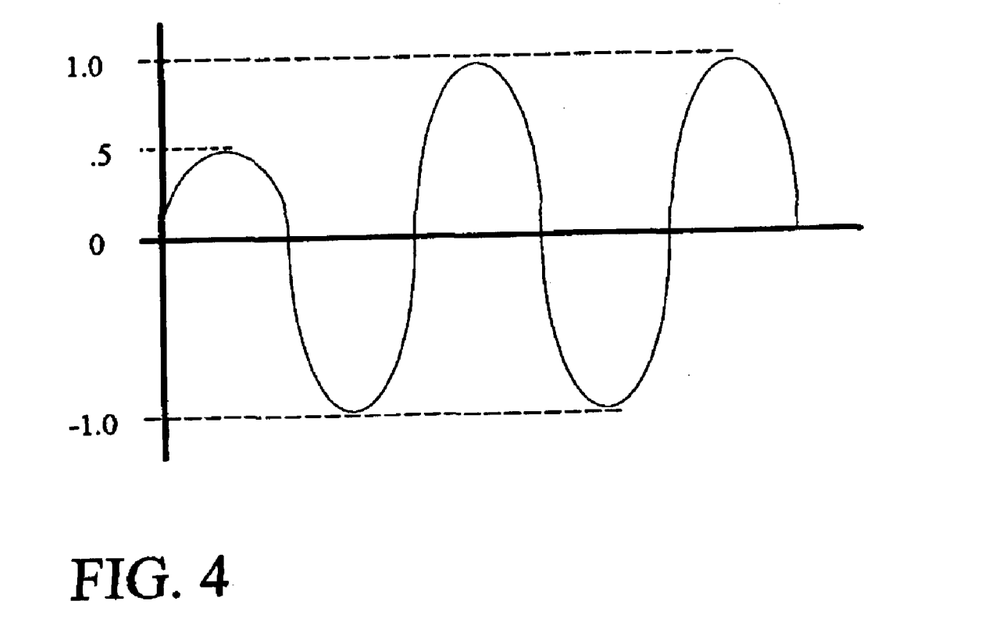
FIG. 4 is an illustration of an output current signal from the current transformer in FIG. 3 depicting current vs. time.

Referring to FIGS. 3 and 4, the need for a first and second threshold value is outlined. A graph of a material's magnetic response (i.e., internal magnetic flux density, ("B") to an applied magnetic field strength, ("H"), is known as a hysteresis loop, or B–H curve as illustrated in FIG. 3 for the current transformer core 32 of FIGS. 1 and 2. As FIG. 3 shows, magnetization curves of the current transformer core 32 do not retrace themselves when increasing and then decreasing an external magnetic field, H. The current transformer 22 is unmagnetized at (point a). As current is applied to current transformer 22 at power up the transformer core 32 saturates at (point b). When the current approaches zero again heading towards saturation at (point c), one can see that the transformer core is magnetized when crossing zero at (point d). When the applied magnetic field strength, H, is increased and then decreased back to its initial values the domains do not return completely to their original configuration but retain some "memory" of the initial increase. The current flowing in the secondary winding of CT 22 is a result of the secondary windings breaking changing lines of magnetic force (flux). The flux in the core is related to the magnitude of the magnetic field excursion.

During steady state operation, the magnetic field changes from a positive maximum (point b) to a negative maximum (point c). However on the first half of the first cycle when powering up, the field starts at zero (point a). Thus, the excursion is from point a towards either a positive or negative maximum, points b or c, respectively. This causes the "stunted" output for one half cycle at power up illustrated in FIG. 4.

Turning to FIG. 4, a current versus time curve relating to the magnetization curve in FIG. 3 is shown. The vertical axis representative of current outlines a peak amplitude of current with a "1.0" when positive and a peak amplitude of current with a "−1.0" when negative. At power up and time =0, the current transformer output is also 0. At the first peak of the first half of the first cycle, the amplitude is about one half (0.5) of the steady state peak amplitude of 1. It can be seen that the peak amplitude at the end of the first cycle is 1, accurately reflecting current flow in the circuit breaker. Since the ETU uses the current transformer to sense the amplitude value of the current that flows through the circuit breaker, the initial conditions in the CT magnetic flux limits the peak amplitude of the output on the first half cycle of the first cycle after power up. During steady state operation, the CT flux density transitions from a positive peak value through zero to a peak negative value. This flux density excursion is proportionate to the input or current flow in the circuit breaker. However, at power up the excursion of flux density initiates at zero as opposed to a peak positive or peak negative value. This results in half of the steady state excursion and consequently results in the secondary transformer output indicating only one half the actual current amplitude during the first half of the fist half cycle. The solution to accurately reflect the current flow in the circuit breaker during the first half cycle includes having a trip threshold set to half of the nominal trip threshold for instantaneous tripping for use during the first half cycle. Then the microcontroller would set the instantaneous trip threshold back to the nominal threshold value after about the first half cycle. In this manner, the microcontroller can accurately detect an overcurrent condition during the first half cycle after power up using the same current sensor.

Figure 5:
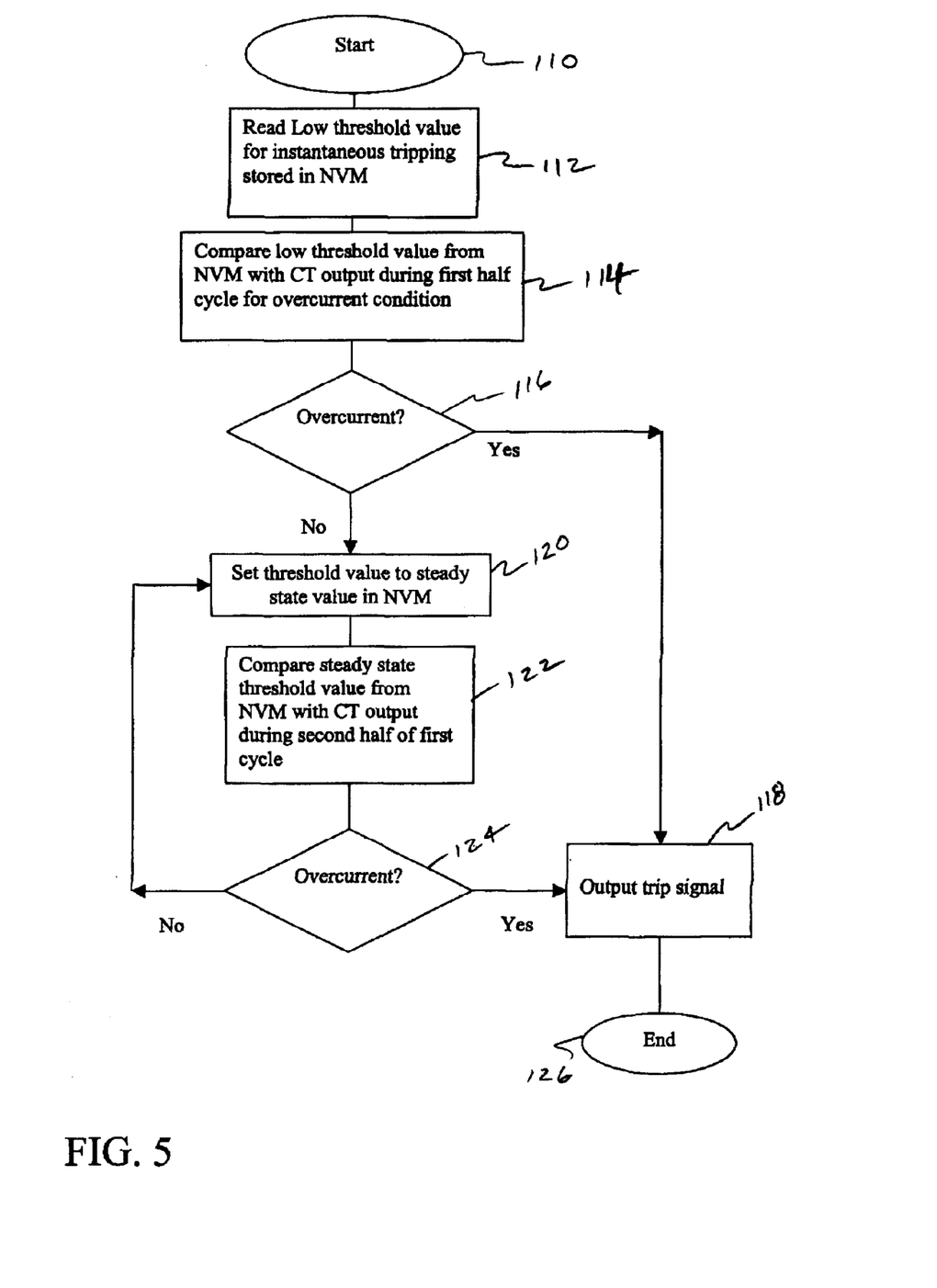
FIG. 5 shows a flow chart for operation of a trip unit of an exemplary embodiment.

Referring to FIG. 5, controller 54 begins at block 110 labeled "START", and then proceeds to block 112 where microcontroller reads a low threshold value from NVM for instantaneous tripping during the first half of the first cycle. At block 114, Output 63 generates a trip signal in line 61 in response to a signal from controller 54. Trip module 26 actuates movable contacts 20 in response to a trip signal from trip unit 18, causing movable contacts 20 to separate from stationary contacts 21. If no over-current condition is detected at block 116, control then proceeds to block 120 wherein, controller 54 is programmed to set the threshold value for instantaneous time-current limits to a steady state operation value. Next, controller 54 compares current characteristics with the time-current limits defined by the new control parameters (i.e., steady state threshold value) at block 122. If the current exceeds time-current limits defined by the control parameters after about the first half cycle after power up, then an over-current condition is determined at block 124 and controller 54 proceeds to block 118 wherein controller 54 instructs output 63 to generate a trip signal. If no over-current condition is determined at block 124, then proceed to block 120. Once a trip signal is output at step 118, the control stops at block 126.

Any trip condition sensed may be annunciated by illuminating a representative LED on display 57 and/or displaying a message on display 57 that the particular fault condition exists if display 57 has alphanumeric capability. An audible alarm may also be provided for directing attention to the display. As with other fault conditions, the annunciation may take the form of outputting a signal via communications port 55 to a remote monitoring state.

The above described method and apparatus provides a circuit breaker capable of tripping during the first half cycle of the first cycle after power up even though the a current transformer's output is limited by the flux density excursion that takes place at power up. The above described method and apparatus allows a cost effective implementation of current electronic trip units using existing current transformers to perform a protective algorithm during the first half cycle to determine whether the circuit breaker should trip during this time period rather than wait another cycle for making this determination or altering the first cycle current transformer output. Thus, a cost effective and protective method and apparatus to compensate for magnetic variation due to the initial condition of a current transformer is disclosed herein.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A method of protecting a power circuit, including within a first cycle after powering up, using an electronic trip unit and a current transformer to sense current, the method comprising:

accepting a first trip threshold value at power up;

sensing for a trip condition in said power circuit within about a first half cycle of the first cycle with reference to said first trip threshold value, said trip condition comprising an over-current condition;

generating a trip signal if said trip condition is sensed with reference to said first trip threshold value;

accepting a second trip threshold value after said first half cycle if said trip condition is not sensed;

sensing for said trip condition with reference to said second trip threshold value; and     generating a trip signal if said trip condition is sensed with reference to said second trip threshold value.

2. The method set forth in claim 1 wherein said sensing comprises:

connecting at least one current transformer coupled to at least one phase line of the power circuit.

3. The method set forth in claim 1 wherein said sensing comprises:
    coupling a current transformer to each phase wire of the power circuit; and
    monitoring said current transformers for an over-current condition.

4. The method set forth in claim 1 wherein said accepting said first and second trip threshold values comprises;
    retrieving said first and second trip threshold values from a nonvolatile memory of the electronic trip unit for a microprocessor of the electronic trip unit to compare with the sensed current.

5. The method set forth in claim 1 wherein said first trip threshold value is about half of said second trip threshold value.

6. The method set forth in claim 1 wherein said generating a trip signal comprises annunciating said trip condition including illuminating an LED for communicating that a trip condition occurred and the type of trip condition that occurred.

7. The method set forth in claim 6 wherein said annunciating comprises displaying a message for communicating that a trip condition occurred and the type of trip condition that occurred.

8. The method set forth in claim 6 wherein said annunciating includes visually communicating to an operator that a fault condition occurred and the type of fault condition that occurred.

9. The method set forth in claim 6 wherein said annunciating comprises making said annunciation at a remote monitoring location.

10. The method set forth in claim 1 wherein said second trip threshold value is accepted at about completion of said first cycle after power up.

11. A trip unit for determining a trip condition within about a half cycle after power up using a current sensor to sense current comprising:
    a current transformer as the current sensor to sense current;
    an input for inputting a signal from the current transformer,
    an analog to digital converter converting said signal into digital form; and
    a controller having first and second trip threshold values stored therein for determining an instantaneous trip condition, said controller accepting said first trip threshold value at power up, said controller accepting said second trip threshold value and replacing said first trip threshold value with said second trip threshold value after power up, said controller monitoring said signal and determining whether an over-current condition exists with reference to one of said accepted trip threshold values, said controller causing a trip signal to be output in the case of an over-current condition.

12. The trip unit set forth in claim 11 wherein said output trip signal comprises a transmission of a signal to a remote monitoring location.

13. The trip unit set forth in claim 11 wherein said output trip signal is directed towards a display unit for displaying the trip condition.

14. The trip unit set forth in claim 11 wherein said output trip signal is directed to a trip module to actuate a separation of contacts.

15. The trip unit set forth in claim 11 wherein said first and second trip threshold values are operator selectable.

16. The trip unit set forth in claim 11 wherein said first and second trip threshold values are stored in nonvolatile memory.

17. The trip unit set forth in claim 11 wherein said second trip threshold value is about twice the value of said first trip threshold value.

18. The trip unit set forth in claim 11 wherein said second trip threshold value is accepted after about a first half cycle of a first cycle after power up.

19. The trip unit set forth in claim 11 wherein said second trip threshold value is substituted for said first trip threshold value at about the first cycle after power up.

20. The trip unit set forth in claim 11 wherein said second trip threshold value is a nominal instantaneous trip value setting.

21. The trip unit set forth in claim 11 wherein said current transformer includes:
    a metal core having a concentrical opening extending through the height so that the distance between an outside point on the concentrical opening and the closest outside point of the core defines a thickness of the core at that point;
    a primary winding that passes through the opening;
    a secondary winding that extends through the opening and encircles the thickness of the core, said secondary winding in operable communication with said input; and
    a partial air gap located in the metal core.

22. The trip unit set forth in claim 21 wherein the metal core is in the shape of a toroid.

23. The tip unit set forth in claim 21 further comprises a load strap that connects with an external electrical distribution circuit, wherein the load strap functions as the primary winding.

24. A circuit breaker comprising:
    a pair of separable contacts and terminals for placing said separable contacts in a power circuit;
    a trip unit;
    a trip module adapted to separate said separable contacts in response to a trip signal from said trip unit;
    a current transformer to sense current; and wherein said trip unit includes,
    an input for inputting a signal from the current transformer,
    an analog to digital converter converting said signal into digital form, and
    a controller having first and second trip threshold values stored therein for determining an instantaneous trip condition, said controller accepting said first trip threshold value at power up, said controller accepting said second trip threshold value and replacing said first trip threshold value with said second trip threshold value after power up, said controller monitoring said signal and determining whether an over-current condition exists with reference to one of said accepted trip threshold values, said controller causing said trip signal to be output in the case of an over-current condition.

25. The circuit breaker set forth in claim 24 wherein said output trip signal comprises a transmission of a signal to a remote monitoring location.

26. The circuit breaker set forth in claim 24 wherein said output trip signal is directed towards a display unit for displaying the trip condition.

27. The circuit breaker set forth in claim 24 wherein said output trip signal is directed to a trip module to actuate a separation of contacts.

28. The circuit breaker set forth in claim 24 wherein said first and second trip threshold values are operator selectable.

29. The circuit breaker set forth in claim 24 wherein said first and second trip threshold values are stored in nonvolatile memory.

30. The circuit breaker set forth in claim 24 wherein said second trip threshold value is about twice the value of said first trip threshold value.

31. The circuit breaker set forth in claim 24 wherein said second trip threshold value is accepted after about a first half cycle of a first cycle after power up.

32. The circuit breaker set forth in claim 24 wherein said second trip threshold value is substituted for said first trip threshold value at about the first cycle after power up.

33. The circuit breaker set forth in claim 24 wherein said second trip threshold value is a nominal instantaneous trip value setting.

34. The circuit breaker set forth in claim 24 wherein said current transformer includes:

a metal core having a concentrical opening extending through the height so that the distance between an outside point on the concentrical opening and the closest outside point of the core defines a thickness of the core at that point;

a primary winding that passes through the opening;

a secondary winding that extends through the opening and encircles the thickness of the core, said secondary winding in operable communication with said input; and a partial air gap located in the metal core.

35. The circuit breaker set forth in claim 34 wherein the metal core is in the shape of a toroid.

36. The circuit breaker set forth in claim 34 further comprises a load strap that connects with an external electrical distribution circuit, wherein the load strap functions as the primary winding.

* * * * *